March 11, 1941.   M. KATCHER   2,234,843
CLUTCH THROW-OUT BEARING
Filed March 12, 1938
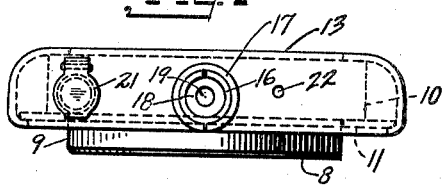
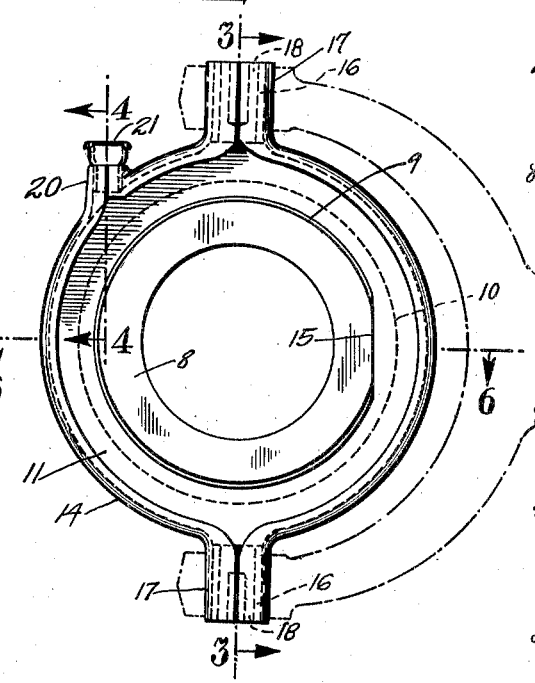
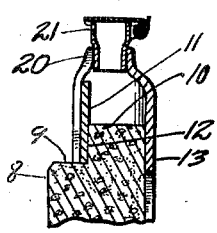
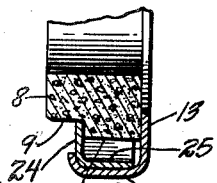
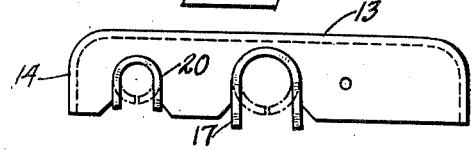
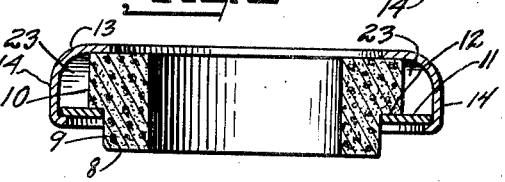
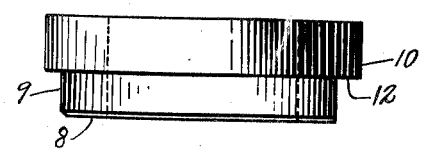
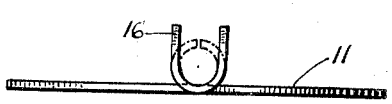
INVENTOR
*Morris Katcher*
BY
*Emanuel Scheyer*
ATTORNEY Patented Mar. 11, 1941

2,234,843

UNITED STATES PATENT OFFICE 2,234,843

CLUTCH THROW-OUT BEARING

Morris Katcher, New York, N. Y.

Application March 12, 1938, Serial No. 195,442

7 Claims. (Cl. 192—98)

This invention relates to bearings, particularly bearings wherein a contact or bearing part of suitable anti-friction material such as graphite, carbon or a combination of graphite with other carbons or metals is confined by a sheet metal container. It is especially useful in connection with clutch throw-out bearings for automobiles, although its use is not limited to such bearings.

Hitherto the contact or bearing part has been mounted in a cast iron container which is brittle and much heavier than my container. Cast iron containers often crack at the trunnions. Further, the cast iron container is usually shrunk on inducing initial internal stresses in the parts, making them liable to breakage. With my invention, the sheet metal container is just clamped on, the parts of the container being bent over to grip each other. Owing to the tight fit of a shrunken on cast iron container, a special oil groove has to be provided, while with my construction, since there are only a few places of contact between the container and the anti-friction bearing, a large oil reservoir is readily provided.

Other objects and advantages will become apparent upon further study of the description and drawing, in which:

Fig. 1 is a top plan view of the clutch throw-out bearing.

Fig. 2 is a front elevation with a portion of the forked shifting lever shown in dot and dash lines.

Fig. 3 is a section taken along the line 3—3 of Fig. 2.

Fig. 4 is a partial section taken along the line 4—4 of Fig. 2.

Fig. 5 shows the three main parts before assembly and bending.

Fig. 6 is a section taken along the line 6—6 of Fig. 2, and

Fig. 7 is a partial section through a modified form in which the cover is cup-shaped.

The annular bearing 8, of graphite, carbon or a combination of graphite with other carbons or metals, has a portion 9 of smaller diameter and a portion 10 of larger diameter. A sheet metal cover 11 has an opening therein to fit snugly over portion 9 of bearing 8. Cover 11 is set from the front of the bearing on portion 9 so that it is up tight against shoulder 12 of the bearing. Cup-shaped body 13 is set against the rear of the bearing with its annular forwardly extending flange 14 extending over portion 10 in spaced relation thereto. In Fig. 5 body 13 is shown before it is bent into its final shape. As seen in Fig. 6, said body is bent into its final shape, the forward end of flange 14 being then curled over the edge of cover 11 holding bearing 8 tightly between said cover and body 13.

Portion 9 of bearing 8, instead of having its outside surface truly cylindrical, is flattened at 15. The opening in cover 11 is correspondingly flattened so that when the latter is fitted in position over portion 9 there can be no relative rotation between said cover and the bearing.

Cover 11 before being assembled and finally bent is provided with a U shaped tab 16 at its top and bottom. In a similar manner body 13 is provided with U shaped tabs 17. Cover 11 is mounted on bearing 8 so that U shaped tabs 16 come inside of U shaped tabs 17. When in the final stamping or bending operation tabs 16 are curled into cylindrical form inside of tabs 17, the latter likewise being curled into cylindrical form. The two sets of tabs thus curled form the trunnions of the clutch throw-out bearing. Inside each trunnion is forced a plug 18 having a cylindrical recess 19.

Body 13 is also provided with a tab 20 which is curled to form a support for oil cup 21. A breather hole 22 is provided in body 13 to equalize the pressure of oil inserted through cup 21 into annular oil space 23.

In the alternate form shown in Fig. 7, the cover 24 is cup-shaped being provided with a rearwardly extending flange 25, otherwise this form is the same as that shown in the other figures.

I claim:

1. A clutch throw-out bearing comprising a bearing member and a container fastened thereon, said bearing member having its rear portion of larger outside diameter than its front portion, said container having an annular sheet metal body portion and an annular sheet metal disc cover member, said body portion having its rear contact the rear of the bearing member and its side extend forward over the side of the bearing member, said cover member fitting over the bearing member on its front portion and held against the shoulder formed on the bearing member at the junction of its portions of larger and smaller diameters, said body portion having the forward end of its side bent over the edge of the cover member and in tight contact with the forward face of said cover member for holding the latter tight against said shoulder and the rear of the body portion tight against the rear of the bearing member.

2. A clutch throw-out bearing comprising an annular bearing member and a container fastened thereon, said bearing member being formed with a radially extending shoulder on its outer surface at a location intermediate its front and rear face, said container having an annular body portion and an annular cover member, said body portion contacting the rear of the bearing member and having its side extend forward over the outside of the bearing member, said cover member forming the front wall of the container and fitting over the bearing member and held back against said shoulder, said body portion having the forward portion of its side clamped to the cover member for holding the latter tight against said shoulder and the rear of the body portion tight against the rear of the bearing member.

3. A clutch throw-out bearing comprising an annular bearing member and a container fastened thereon, said bearing member being formed with a shoulder on its outer surface at a location intermediate its front and rear face, said shoulder facing forward, said container having an annular cup-shaped sheet metal body member and an annular sheet metal cover member, the rear of said body member contacting the rear of the bearing member and having its side extend forward over the outside of the bearing member and in spaced relation thereto, said cover member encircling the bearing member and held back against said shoulder, said body member being fastened at its side to the cover member for holding the latter tight against said shoulder and the rear of the body member tight against the rear of the bearing member, an annular space being provided thereby between the container and the outside of the bearing member constituting an oil reservoir.

4. A clutch throw-out bearing comprising an annular bearing member and a container fastened thereon, said bearing member being formed with a shoulder on its outer surface at a location intermediate its front and rear face, said container having an annular cup-shaped sheet metal portion and an annular cup-shaped sheet metal cover member oppositely disposed to each other on the bearing member, the side of the cover member coming inside the side of the body portion, said body portion contacting the rear of the bearing member and having its side extend forward over the side of the bearing member, said cover member fitting over the bearing member and held back against said shoulder, said body portion having the forward end of its side curled over onto the front face of the cover member for clamping the front portion of the latter tight against said shoulder and the rear of the body portion tight against the rear of the bearing member.

5. A clutch throw-out bearing comprising an annular bearing member and a container fastened thereon, said bearing member being formed with a shoulder on its outer surface at a location intermediate its front and rear face, said shoulder facing forward, said container having an annular sheet metal body member and an annular sheet metal cover member, said body member overlapping the rear of the bearing member, said cover member encircling the bearing member in front of said shoulder and held back against the latter, said body member and cover member being fastened to each other and forming a space with the portion of the bearing member between them constituting an oil reservoir.

6. A clutch throw-out bearing comprising a ring-shaped bearing member and a container fastened thereon, said container having an annular sheet metal body member and an annular sheet metal cover member, said body member overlapping the rear face of the bearing member, said cover member fitting on the bearing member at a place intermediate the front and rear of the latter, said body member and cover member being fastened to each other and enclosing the portion of the bearing between them, diametrically opposed tabs extending radially from the body member and diametrically opposed tabs extending radially from the cover member, said tabs being curled into hollow cylindrical form to act as trunnions, each tab of one of the members nesting in a tab of the other member.

7. A clutch throw-out bearing comprising a ring-shaped bearing member and a container fastened thereon, said container having an annular sheet metal body member and an annular sheet metal cover member, said body member overlapping the rear face of the bearing member, said cover member fitting on the bearing member at a place intermediate the front and rear of the latter, said body member and cover member being fastened to each other and enclosing the portion of the bearing between them, diametrically opposed tabs extending radially from the body member, diametrically opposed tabs extending radially from the cover member, said tabs being bent into hollow supports to act as trunnions, each tab of one of the members nesting in a tab of the other member, and a pin inserted in each nested in tab.

MORRIS KATCHER.